United States Patent
Sayre et al.

(10) Patent No.: US 7,897,650 B2
(45) Date of Patent: Mar. 1, 2011

(54) IONICALLY CONDUCTIVE POLYMERS FOR USE IN FUEL CELLS

(76) Inventors: Jay R. Sayre, Gahanna, OH (US); Ramanathan S. Lalgudi, Westerville, OH (US); Bhima R. Vijayendran, Dublin, OH (US)

( * ) Notice: Subject to any disclaimer, the term of this patent is extended or adjusted under 35 U.S.C. 154(b) by 337 days.

(21) Appl. No.: 11/980,873

(22) Filed: Oct. 31, 2007

(65) Prior Publication Data
US 2009/0061277 A1    Mar. 5, 2009

(51) Int. Cl.
C08J 5/20 (2006.01)
H01M 8/10 (2006.01)
H01B 1/04 (2006.01)

(52) U.S. Cl. .................. 521/25; 429/33; 252/62.2; 252/500

(58) Field of Classification Search .......... 521/25; 429/33; 252/62.2, 500
See application file for complete search history.

(56) References Cited

U.S. PATENT DOCUMENTS

| | | | |
|---|---|---|---|
| 6,503,378 B1 * | 1/2003 | Fisher | 204/296 |
| 6,926,984 B2 | 8/2005 | Asano et al. | |
| 6,964,823 B2 | 11/2005 | Koyama et al. | |
| 7,534,515 B2 * | 5/2009 | Nam et al. | 429/33 |
| 2005/0164063 A1 | 7/2005 | Wariishi et al. | |
| 2006/0036064 A1 | 2/2006 | McGrath et al. | |

FOREIGN PATENT DOCUMENTS

JP   2005228671 A  *  8/2005
WO   WO 03062493 A1 *  7/2003

OTHER PUBLICATIONS

Lei et al., Abstract, Effect of copolymer composition on the oxygen transport properties of sulfonated poly(arylene ether sulfone) and sulfonated poly(sulfide sulfone) PEMs, Electrochemical Society, Pennington, NJ ETATS-UNIS (1948) (Revue), p. 1 of 1.
Von Kraemer et al., Abstract, Gas diffusion electrodes and membrane electrode assemblies based on a sulfonated polysulfone for high-temperature pemfc, Electrochemical Society, Pennington, NJ, ETATS-UNIS (1948) (Revue), p. 1 of 1.

* cited by examiner

*Primary Examiner*—Michael M Bernshteyn
(74) *Attorney, Agent, or Firm*—MacMillan, Sobanski & Todd, LLC (57) ABSTRACT

An ionically conductive polymer is a copolymer including first and second polymer segments. The first polymer segments have a hydrophobic character and a high oxygen permeability. The second polymer segments have a hydrophilic character and a low oxygen permeability. The copolymer has an ionic conductivity of at least about $1\times10^{-5}$ S/cm at any point within a temperature range of from 30° C. to 150° C. and a relative humidity range of from 20% to 100%. The ionically conductive polymer can be used in an electrochemical device such as a fuel cell, for example, used as a binder in an electrode or used to produce a membrane.

17 Claims, 2 Drawing Sheets

Polarization Curve

Figure 1. Polarization Curve

Figure 2. HFR Plot

Figure 3: Ion exchange terminal groups of branched poly(aryl ether sulfone)

Fig. 4: 6F Polymer

IONICALLY CONDUCTIVE POLYMERS FOR USE IN FUEL CELLS

BACKGROUND OF THE INVENTION

This invention relates in general to polymers, and in particular to ionically conductive polymers for use in fuel cells and other electrochemical devices. For example, the polymers may be used as binders in fuel cell electrodes and/or for producing fuel cell membranes.

A fuel cell is an electrochemical device that continuously converts chemical energy into electric energy and some heat for as long as fuel and oxidant are supplied. Fuel cells are evolving. Some currently known categories of fuel cells include polymer electrolyte membrane (PEM), alkaline, phosphoric acid, molten carbonate, solid oxide, and microbial/enzyme based.

At the heart of the PEM fuel cell is a membrane electrode assembly (MEA). The MEA includes a membrane made from a polymer electrolyte or proton conducting polymer. The polymer electrolyte membrane is sandwiched between a pair of electrodes called an anode and a cathode. The MEA also usually includes porous, electrically conductive sheets called gas diffusion layers positioned adjacent to the electrodes to permit diffusion of reactants to the electrodes.

In operation, a fuel such as hydrogen or methanol is flowed into contact with the anode where it dissociates into electrons and protons. The electrons, which cannot pass through the membrane, flow from the anode to the cathode through an external circuit containing an electric load, which consumes the power generated by the cell. The protons pass through the membrane and combine with oxygen and electrons on the cathode to produce water and heat.

The electrodes are applied as thin layers on opposing sides of the membrane. The electrodes include particles of an electrocatalyst such as platinum. The catalyst particles are often supported on electron conducting carrier particles such as carbon particles. The electrodes are typically formulated by combining the catalyst and carrier particles with an ionically conductive polymer, often referred to as a binder, that holds the particles together and provides the electrode with mechanical integrity. The ionically conductive polymer is proton conducting and is sometimes electron insulating and other times electron conducting depending on the particular polymer(s). A fluorinated polymer sold by DuPont under the tradename Nafion™ is often used as the binder.

U.S. Patent Application No. 2006/0036064 A1 by McGrath et al., published Feb. 16, 2006, discloses sulfonated polymers for use as binders in fuel cell electrodes. Specific examples of polymers include polysulfones, polyimides, polyketones, and poly(arylene ether phosphine oxide)s. The sulfonated polymer can be used to form the polymer electrolyte membrane as well as the anode and/or cathode of a membrane electrode assembly.

U.S. Pat. No. 6,964,823 B2 by Koyama et al., issued Nov. 15, 2005, discloses polymers such as poly-ether ether ketone and poly-ether sulfone having sulfonated side chains. The polymers can be used in a membrane electrode assembly of a fuel cell both to form the polymer electrolyte membrane and as a binder in the electrodes.

Von Kraemer et al., "Gas diffusion electrodes and membrane electrode assemblies based on a sulfonated polysulfone...", Journal of the Electrochemical Society 153 (11), 2077-2084 (2006), discloses a membrane electrode assembly in which a sulfonated polysulfone is used as a binder in the electrodes and is used to make the polymer electrolyte membrane.

SUMMARY OF THE INVENTION

In one embodiment, an ionically conductive polymer is a copolymer including first and second polymer segments. The first polymer segments have a hydrophobic character and a high oxygen permeability. The second polymer segments have a hydrophilic character and a low oxygen permeability. The copolymer has an ionic conductivity of at least about $1 \times 10^{-5}$ S/cm at any point within a temperature range of from 30° C. to 150° C. and a relative humidity range of from 20% to 100%.

In another embodiment, an ionically conductive polymer has ion exchange terminal groups. The polymer is sufficiently branched to cause the polymer to have a low crystallinity that increases the ionic conductivity of the polymer. The polymer has an ionic conductivity of at least about $1 \times 10^{-5}$ S/cm at any point within a temperature range of from 30° C. to 150° C. and a relative humidity range of from 20% to 100%.

In another embodiment, a polymer composition for use as a binder in a fuel cell electrode is provided. The polymer composition comprises a combination of an ionically conductive polymer and a high reactant diffusion polymer.

In another embodiment, an ionically conductive polymer for use as a binder in a fuel cell electrode has ion exchange groups and also has electron withdrawing groups attached to the ion exchange groups to enhance the acidity of the polymer. The polymer has a pKa not greater than about 2.0.

In a further embodiment, a membrane electrode assembly comprises a polymer electrolyte membrane made from an ionically conductive hydrocarbon polymer containing less than 10 wt % fluorine, and electrodes applied to opposing sides of the membrane. The electrodes include electrocatalyst particles and a binder that holds the particles together and provides the electrode with mechanical integrity. The binder also comprises an ionically conductive hydrocarbon polymer containing less than 10 wt % fluorine.

DETAILED DESCRIPTION OF THE PREFERRED EMBODIMENTS

Ionically conductive polymers are provided for use in fuel cells and other electrochemical devices that overcome some of the drawbacks of previous polymers.

In one embodiment, an ionically conductive polymer comprises a copolymer including first and second polymer segments or blocks. The first polymer segments have a hydrophobic character and a relatively high oxygen permeability. The first polymer segments can be any suitable oxygen permeability; in a particular embodiment, they have an oxygen permeability of at least about $2000 \times 10^{-13}$ cc*cm/(cm*sec*atm). In one aspect, the first polymer segments form amorphous (substantially noncrystalline) domains or regions of the polymer. The amorphous domains are conducive to oxygen transport through the polymer.

The second polymer segments have a hydrophilic character and a relatively low oxygen permeability. The second polymer segments can be any suitable oxygen permeability; in a particular embodiment, they have an oxygen permeability of less than about $0.2 \times 10^{-13}$ cc*cm/(cm*sec*atm).

The copolymer having the first and second polymer segments is particularly desirable for use as a binder in a fuel cell electrode because of its combination of properties, such as good oxygen permeability, ionic conductivity and water management. The hydrophobic polymer segments are effective in managing water to decrease mass transport losses.

The first and second polymer segments are both relatively temperature stable so that the copolymer is able to retain its conductivity at higher temperatures. The copolymer has an ionic conductivity of at least about $1 \times 10^{-5}$ S/cm, and particularly at least about $1 \times 10^{-4}$ S/cm, at any point within a temperature range of from 30° C. to 150° C. and a relative humidity range of from 20% to 100%. This contrasts with a Nafion polymer which loses much of its ionic conductivity under these conditions.

The copolymer can include any suitable types of polymers, or combinations of different polymers, as the first and second polymer segments. Some examples of polymers that could be used as the first polymer segments include polyphosphazene, poly(meta-silphenylene siloxane), poly(para-silphenylene siloxane), poly(methyl propyl siloxane), poly(methyl octyl siloxane), poly(triflouropropyl methyl siloxane), poly(phenyl methyl siloxane), poly(silethylene siloxane), poly(silhexylene siloxane), poly(siloctylene siloxane), poly(methyl-1-pentenylene), poly(oxydimethylsilylene), poly(methyl ethyl siloxane), poly(dimethyl silmethylene), poly(isoprene), poly(butadiene), poly(isoprene) trans, vulcanized purified gutta percha, poly(chloroprene), and polyhedral oligomeric silsesquioxane. In one embodiment, the first polymer segment is a silicon-based organic polymer which is hydrophobic and has a high oxygen permeability. In a particular embodiment, the polymer is a poly(dimethyl siloxane) polymer. The poly(dimethyl siloxane) forms an amorphous domain of the polymer.

In one aspect, the poly(dimethyl siloxane) polymer or other first polymer segment is modified with an end group to facilitate its attachment to the second polymer segment. Any suitable end group can be used, and it will depend on the particular structures of the first and second polymer segments. For example, the end group can be hydroxyl, carboxylic acid, epoxy, aldehyde, amino, allyl, vinyl, or halogen.

In one embodiment, the second polymer segment is an aromatic hydrocarbon polymer which is hydrophilic and has a low oxygen permeability. Some examples of polymers that could be used as the second polymer segments include polysulfone, polyether ketone, polyimide, polyphenylene oxide, polystyrene, polyacrylate, and polyheterocyclics such as poly(benzimidazole), poly(benzoxazole), poly(benzthiazole) and poly(oxadiazole). In one aspect, the second polymer segment is sulfonated, carboxylated, phosphonated or a combination thereof. More particularly, in one embodiment the second polymer segment is a sulfonated poly(aryl ether sulfone).

The first and second polymer segments can be combined in any suitable manner to form the copolymer. In one embodiment, the first polymer segment is attached to an end of the second polymer segment.

Scheme 1 below shows an example of the production of sulfonated poly(aryl ether sulfone-b-dimethyl siloxane). The end groups of sulfonated poly(aryl ether sulfone) are reacted with poly(dimethyl siloxane) with suitable end groups. In the example shown, the end group of the PDMS is epoxy. It has been observed that inclusion of 0.1 mole % of PDMS segment with a number average molecular weight of 1000 increases the oxygen permeability of the base polymer by a factor of 2.5.

Scheme 1: Synthesis of sulfonated poly(aryl ether sulfone-b-dimethysiloxane

EXAMPLE 1a

The polymer shown in scheme 1 was obtained as follows. In a 250 mL three neck round bottom flask, fitted with a stir rod, thermocouple, Dean Stark condenser and inlet for gas purging, charged 10.2 grams of Sulfonated poly(aryl ether sulfone) with degree of sulfonation=50%, $K_2CO_3$ (3.1 gram) 75 mL N,N-dimethylacetamide and 35 mL toluene. The reagents were heated slowly until the reflux temperature reached (~133° C.) and maintain the reflux for 4 hours. Toluene was gradually removed and increased the temperature to 160° C. and removed the remaining toluene. The flask was cooled to 60° C. and added 10.1 of diglycidylether terminated poly(dimethyl siloxane) with number average molecular weight 5000 over a period of one hour. The flask was slowly heated to 120° C. and reaction was maintained for 12 h at that temperature. At the end of 12 h, the reaction mixture was cooled down to room temperature. The product obtained was isolated by precipitating in water and drying in a vacuum oven at 120° C. for 24 h.

EXAMPLE 1b

In a 500 mL three neck round bottom flask, fitted with a stir rod, thermocouple, Dean Stark condenser and inlet for gas purging, charged 22.3 gram of Sulfonated poly(aryl ether sulfone) with degree of sulfonation=50%, 250 mL N,N -dimethylacetamide and 70 mL toluene. The reagents were heated slowly until the reflux temperature reached (~133° C.) and maintain the reflux for 4 hours. Toluene was gradually removed and increased the temperature to 160° C. and removed the remaining toluene. The flask was cooled to 20° C. and added 7 mL n-butyl lithium followed by 8.9 g of chlorine terminated poly(dimethyl siloxane) with number average molecular weight 3000 a period of 20 to 30 minutes. The reactants were allowed to stir at room temperature for 16 hours and the product obtained was isolated by precipitating in isopropanol followed drying in a vacuum oven at 120° C. for 24 h.

EXAMPLE 1c

In a 250 mL three neck round bottom flask, fitted with a stir rod, thermocouple, Dean Stark condenser and inlet for gas purging, charged thoroughly dried 25.1 gram of Sulfonated poly(aryl ether sulfone) with degree of sulfonation=35%, 150 mL N,N-dimethylacetamide. The reagents were heated slowly up to 125 deg C. and stirred until all the polymer is completely dissolved in the solvent. The flask was cooled to 20° C. and added 9 mL n-butyl lithium followed by 8.3 g of chlorine terminated poly(dimethyl siloxane) with number average molecular weight 3000 over a period of 20 to 30 minutes. The reactants were allowed to stir at room temperature for 16 hours and the product obtained was isolated by precipitating in isopropanol followed drying in a vacuum oven at 120° C. for 24 h.

EXAMPLE 1d

The following example illustrates an embodiment in which the polymer is obtained by polymerizing hydrophobic and oxygen permeable monomers with hydrophilic and proton conducting monomers. In a resin kettle fitted with a stir rod, thermocouple, Dean Stark condenser and inlet for gas purging, charged biphenol (11.11 g, 0.0387 moles), 4,4'-sulfonylbis(chlorobenzene) (3.3425, 0.0153 moles), sodium 5,5'-sulfonylbis(2-chlorobenzenesulfonate) (20 g, 0.0407 moles), chlorine terminated polydimethylsiloxane ((6.11, 0.0020 moles) $K_2CO_3$ (13.22 g, 0.0957 moles) 260 mL N,N'-dimethylacetamide and 130 mL toluene. The reagents were heated slowly till the reflux temperature reached (~133° C.) and maintain the reflux for 4 hours. Toluene was gradually removed and increased the temperature to 165° C. The reaction was maintained for 20 h at that temperature. At the end of 20 h, the reaction mixture was cooled down to 80° C. and filtered the polymer solution using Buckner funnel fitted with Whatman filter paper No 4. The filtered polymer solution was isolated by precipitating in water and drying in a vacuum oven at 120° C. for 24 h.

Membrane Electrode Assembly Fabrication.

Three-layer MEAs (catalyst-coated membranes) were fabricated with electrocatalyst loadings, types, metals fractions, binders, binder/carbon ratios, and binder/(carbon+metals) ratios as shown below in Table I.

10 g of a polymer as obtained from Example 1c) was acidified by boiling for 2 hours in 300 ml 0.5 M $H_2SO_4$. The solution was rinsed by vacuum filtration with deionized water until the wash effluent was a neutral pH. The polymer solution was then boiled for 2 hours in 300 ml of deionized water. It was rinsed by vacuum filtration with deionized water and dried in a vacuum oven at 100 C for 24 hours under full vacuum.

The acid form of the polymer was dissolved in a 50:50 (by weight) mixture of water:acetone to a 5 wt % polymer solution. The formulation was stirred on a stirplate at 50 C until the polymer was in solution.

Catalyst inks were formulated by combining 4.0 g of the polymer as obtained from Example 1c) 5 wt % solution, 0.5 g of 66.8% Pt on carbon, and 4.0 g of tert-butyl alcohol. The ink formulation was stirred on a stirplate overnight before use.

Each catalyst ink coat/layer was sprayed with a pneumatic sprayer (nitrogen at 25 psig) and ink siphon feed onto one side of a 5 $cm^2$ area, BPS35 $H^+$ membrane, which was secured to a vacuum table. Several light coating passes were required to effectively flash off the solvent under infrared heat until the desired electrode weight/catalyst loading was achieved. Then the membrane was flipped over to fabricate the opposite electrode.

TABLE I

| MEA Conditions Table MEA # 51609-71-4 | | |
|---|---|---|
| Anode | Reactant | $H_2$ |
| | Catalyst loading (mg metals per $cm^2$) | 0.52 |
| | Electrocatalyst type | 66.8 weight % Pt on Vulcan XC-72 C black (TKK) |
| | Metals fraction | 0.668 |
| | Binder (B) | BPS50-PDMS (3:1) H+ in 50:50 Water:acetone (unfiltered) |
| | B/C | 1.20 |
| | B/(metals + C) | 0.4 |
| Cathode | Reactant | Air |
| | Catalyst loading (mg metals per $cm^2$) | 0.68 |
| | Electrocatalyst type | 66.8 weight % Pt on Vulcan XC-72 C black (TKK) |
| | Metals fraction | 0.668 |
| | Binder (B) | BPS50-PDMS (3:1) H+ in 50:50 Water:acetone (unfiltered) |
| | B/C | 1.20 |
| | B/(metals + C) | 0.4 |
| Membrane | | BPS35 (H+ = 0.5M H2SO4, 2 hour, 100 C.) |

TABLE I-continued

MEA Conditions Table
MEA # 51609-71-4

| | |
|---|---|
| Membrane thickness | 54.6 μm |
| Cell area | 5 cm$^2$ |
| Gas diffusion layer (GDL) | SGL 25BC |
| Acidification | none on MEA |

Fuel Cell Testing

Single-cell fuel cell testing was performed using a 600 W Fuel Cell Technologies, Inc. test station with Poco graphite flow fields and glass-reinforced PTFE seals/gaskets. The flow fields were single-serpentine, 800 μm-wide channels with a channel: land width ratio of 1:1 and a 5 cm active area. This station is equipped with an Agilent Technologies 120 A load module, digital mass flow controllers, an automated back pressure system, 5 cm$^2$ fuel cell hardware, an on-board AC impedance. system, and humidity bottle assemblies. The on-board electrochemical impedance spectroscopy system was used to measure the in situ high frequency resistance (HFR) of each MEA at a frequency of 1 kHz. (The HFR is the sum of the membrane, interfacial, and electrode resistances.)

Figure 1:
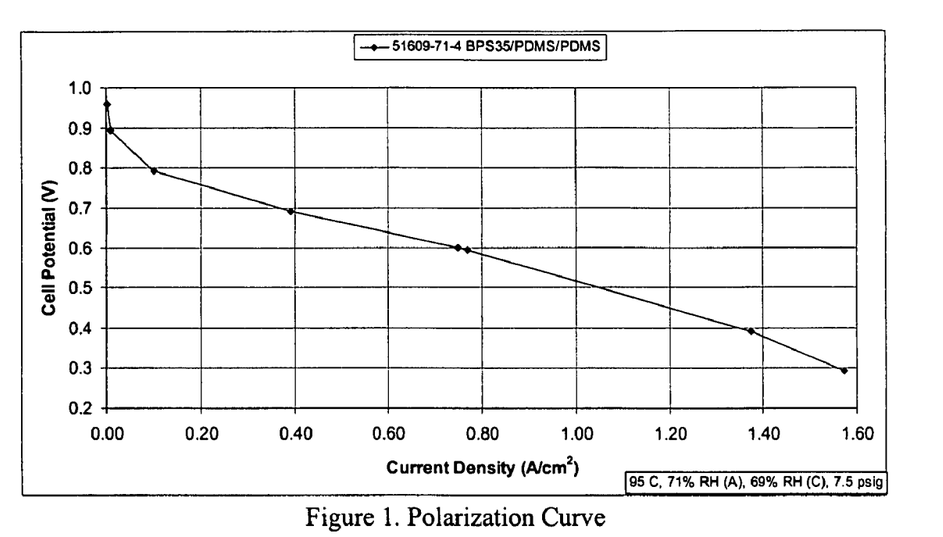
FIG. 1 is a polarization curve of a fuel cell made with the ionically conductive polymers of the first embodiment of the invention.
Figure 2:
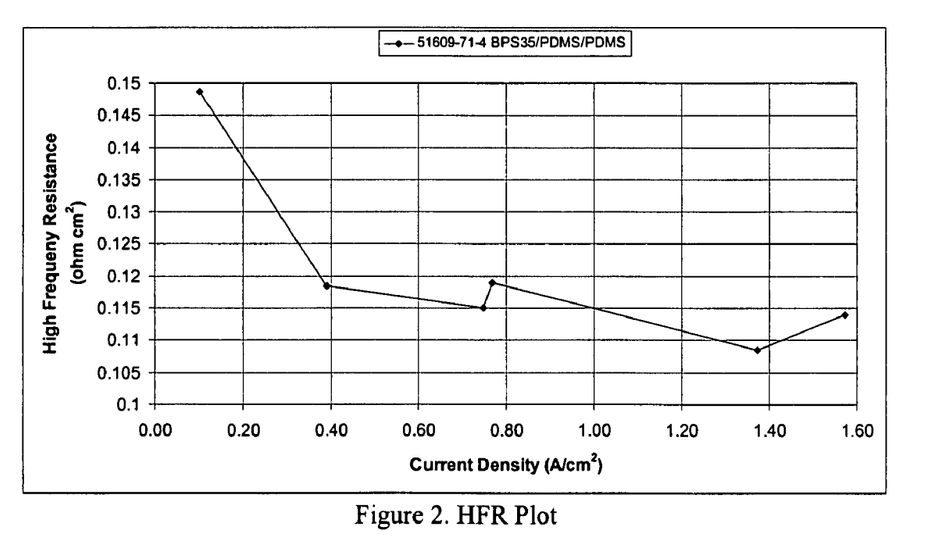
FIG. 2 is an HFR plot of the fuel cell.

All MEAs were conditioned at 0.50 V until the in situ HFR and load achieved stable values before polarization curves were collected. The polarization curve and the HFR plot are shown in FIGS. 1 and 2. Short-term polarization curves were collected from OCV to 0.30 V at 0.10 V increments with a 5 minute delay. The reactants were supplied at 200 sccm (H$_2$) and 500 sccm (air)

In another embodiment, an ionically conductive polymer is provided that is sufficiently branched to cause the polymer to have a low crystallinity that increases the oxygen permeability and the ionic conductivity of the polymer. A branched polymer molecule is composed of a main chain with one or more substituent side chains or branches. The polymer can have any percentage of branching suitable for increasing these properties. In one aspect, the polymer has a percentage of branching of at least about 35%, and more particularly at least about 75%.

The polymer can have any crystallinity that increases the ionic conductivity of the polymer, and may also increase its oxygen permeability. The crystallinity of the polymer can be quantified in any suitable manner, for example by the use of FTIR equipment to measure a crystallinity index between 0 (0% crystallinity) and 1 (100% crystallinity). In one aspect, the polymer has a crystallinity index of not greater than about 0.5, and particularly not greater than about 0.2. In a more particular aspect, the polymer is substantially noncrystalline (crystallinity index of about 0).

The polymer has ion exchange terminal groups. Any suitable groups, or combinations of different groups, can be included to increase the ionic conductivity. Some examples include acid groups, such as sulfonic acid groups, carboxylic acid groups, phosphoric acid groups and phosphonic acid groups. In a particular embodiment the ion exchange terminal groups are sulfonic acid groups and/or phosphonic acid groups.

The polymer has an ionic conductivity of at least about $1\times10^{-5}$ S/cm, and particularly at least about $1\times10^{-4}$ S/cm, at any point within a temperature range of from 30° C. to 150° C. and a relative humidity range of from 20% to 100%.

The polymer can be any suitable type of polymer, or a blend of different polymers. In one embodiment, the polymer is an aromatic hydrocarbon polymer such as one or more of those listed above. In a more particular embodiment, the polymer is a sulfonated poly(aryl ether sulfone).

EXAMPLE 2

Branched Sulfonated poly(aryl ether sulfone)

In a resin kettle fitted with a stir rod, thermocouple, Dean Stark condenser and inlet for gas purging, charged 4,4',4"-(ethane-1,1,1-triyl)triphenol (12.9 g, 0.0421 moles), 4,4'-sulfonylbis(chlorobenzene) (12.09, 0.0421 moles), K$_2$CO$_3$ (6.7 g,) 250 mL N-methyl-2-pyrrolidone and 125 mL toluene. The reagents were heated slowly until the reflux temperature reached (~133° C.) and maintain the reflux for 4 hours. Toluene was gradually removed and increased the temperature to 180° C. The reaction was maintained for 20 h at that temperature. At the end of 20 h, the reaction mixture was cooled down to 80° C. and filtered the polymer solution using Buckner funnel fitted with Whatman filter paper No 4. The filtered polymer solution was isolated by precipitating in water and drying in a vacuum oven at 120° C. for 24 h.

The branched polymer obtained as above (5 g in 20 mL DMAC) was added to 10 gram (20 wt % solution in DMAC) of Sulfonated poly(arylene ether sulfone) with degree of sulfonation 45%. The resultant polymer mixture was used as a binder to make MEA's.

Figure 3:
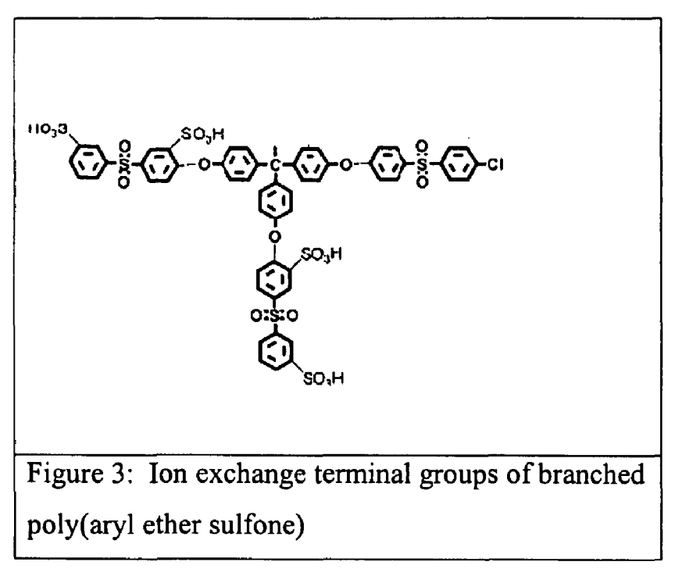
FIG. 3 shows the ion exchange terminal groups of a branched poly(aryl ether sulfone) made according to a second embodiment of the invention.

As shown below, a branched precursor (poly(aryl ether sulfone)) was obtained according to Scheme 2. The branched precursor was then reacted with an ion exchange monomer (sulfonated monochlorodiphenyl sulfone) to give a branched polymer with ion exchange terminal groups (sulfonic acid groups) (FIG. 3).

In another embodiment, a polymer composition suitable for use as a binder in a fuel cell electrode is produced by combining an ionically conductive polymer with a high reactant diffusion polymer. Any suitable ionically conductive polymer can be used, such as any of the hydrocarbon ionically conductive polymers described above.

Figure 4:
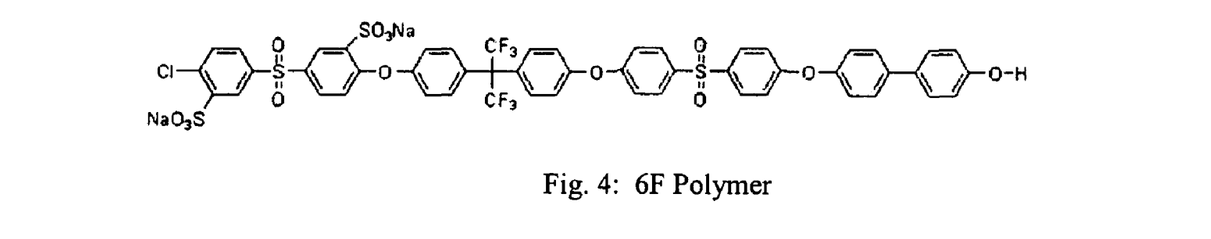
FIG. 4 shows a 6F polymer used for producing an ionically conductive polymer in a third embodiment of the invention.

Also, any suitable high reactant diffusion polymer can be used. By "high reactant diffusion polymer" is meant a polymer that allows a high rate of diffusion of the reactants through the electrode. For example, this polymer may be a copolymer of a siloxane and a fluoropolymer. Any suitable fluoropolymer can be used. One example is the 6F polymer shown below in FIG. 4.

The ionically conductive polymer and the high reactant diffusion polymer can be combined in any suitable proportions. For example, the amount of ionically conductive polymer may be from about 60% to about 95% by total weight of the polymer and the amount of the high reactant diffusion polymer may be from about 5% to about 40% by total weight of the polymer.

In another embodiment, an ionically conductive polymer has ion exchange groups. Any suitable ion exchange groups or combinations thereof can be used. Some examples include sulfonic acid groups, carboxylic acid groups, phosphoric acid groups and phosphonic acid groups. In a particular embodiment, the ion exchange groups are sulfonic acid groups and/or phosphonic acid groups.

The polymer also has electron withdrawing groups attached to the ion exchange groups. Any suitable electron withdrawing groups or combinations of different groups can be used. Some examples include aldehyde, ketone, carboxylic acid ester, trifluoromethyl, nitrile, nitro and amino groups, and combinations thereof.

The electron withdrawing groups attached to the ion exchange groups enhance the acidity of the polymer binder. In some embodiments, the enhanced acidity of the polymer is measured as a pKa value of not greater than about 2.0, and particularly less than 1.0.

In a further embodiment, an ionically conductive polymer is essentially composed of hydrocarbon components (building blocks), by which is meant that the polymer consists predominantly of carbon and hydrogen atoms along its main chain and side chains, although other atoms can also be present. In a particular embodiment, the hydrocarbon polymer contains less than 10 wt % of fluorine, and more particularly the polymer contains substantially no fluorine.

A polymer which is essentially composed of hydrocarbon components can be used to produce a membrane electrode assembly for a fuel cell system having reduced or substantially no hydrofluoric acid (HF) emissions. This is achieved by producing the polymer electrolyte membrane and the polymer electrode binders from one or more polymers these polymers. In other words, the membrane and the binder of the MEA are an all-hydrocarbon system.

Alternatively, the polymer which is essentially composed of hydrocarbon components could be used to produce the binders while the membrane is produced from different polymer(s), or vice versa. However, if the different polymer(s) contain fluorine the fuel cell system could produce hydrofluoric acid emissions.

The above-described ionically conductive polymers can be used in many different applications. In some embodiments, the polymers are used as components or to make components of an electrochemical device such as a fuel cell. Some non-limiting examples include membrane electrode assemblies, membranes, electrodes, binder solutions, catalyst inks, and binders for making membrane electrode assemblies.

When the polymer is used as a binder in a fuel cell electrode, the electrode comprises electrocatalyst particles, which are usually supported on carrier particles, and an ionically conductive polymer as a binder that holds the particles together and provides the electrode with mechanical integrity. The binder and the electrode can be prepared by any suitable method. Typically, the binder is cast from a solution and forms a thin film of electrolyte over the catalyst particles. In one aspect, the binder enables effective catalyst utilization by allowing the simultaneous access of protons, electrons and oxygen to as many catalytically active sites as possible while managing water to decrease mass transport losses.

The intrinsic viscosity (IV) which is an indirect method for determining the molecular weight of the above-described ionically conductive polymers can be optimized to influence the ionic conductivity and oxygen permeability of an electrode binder made with the polymer. In one aspect, the polymer used as a binder has an IV greater than 0.2 dL/g.

Also, when the polymer is used as a binder in a fuel cell electrode, any other suitable ionically conductive polymer can be used to form the polymer electrolyte membrane of the fuel cell.

In accordance with the provisions of the patent statutes, the polymers have been described in terms of their preferred embodiments. However, it must be understood that the polymers may be produced and used otherwise than as specifically described.

What is claimed is:

1. An ionically conductive polymer comprising:
a copolymer including first and second polymer segments;
the first polymer segments having a hydrophobic character and a high oxygen permeability, wherein the first polymer segments are silicon-based organic polymers; and
the second polymer segments having a hydrophilic character and a low oxygen permeability, wherein the second polymer segments are aromatic hydrocarbon polymers selected from the group consisting of polysulfones, polyether ketones, polyimides, polyphenylene oxides, polyacrylates, and polyheterocyclics; and
the copolymer having an ionic conductivity of at least about $1\times10^{-5}$ S/cm at any point within a temperature range of from 30° C. to 150° C. and a relative humidity range of from 20% to 100%.

2. The polymer of claim 1 wherein the first polymer segments have an oxygen permeability of at least about $2000\times10^{-13}$ cc*cm/(cm*sec*atm) and the second polymer segments have an oxygen permeability of less than about $0.2\times10^{-13}$ cc*cm/(cm*sec*atm).

3. The polymer of claim 1 wherein the first polymer segments form amorphous domains of the polymer.

4. The polymer of claim 1 wherein the second polymer segments are sulfonated and/or phosphonated.

5. The polymer of claim 1 wherein the first polymer segments are poly(dimethyl siloxane) polymers modified with end groups that attach to the second polymer segments.

6. The polymer of claim 1 wherein the polymer is obtained by polymerizing hydrophobic and oxygen permeable monomers with hydrophilic and proton conducting monomers.

7. The polymer of claim 1 wherein the polymer has an intrinsic viscosity greater than 0.2 dL/g.

8. The polymer of claim 1 wherein the polymer has ion exchange terminal groups, and wherein the polymer has a percentage of branching of at least about 35% to cause the polymer to have a low crystallinity that increases the ionic conductivity of the polymer.

9. The polymer of claim 8 wherein the polymer has a crystallinity index of not greater than about 0.5.

10. The polymer of claim 8 wherein the ion exchange terminal groups are acid groups.

11. The polymer of claim 8 wherein the polymer is an aromatic hydrocarbon polymer.

12. The polymer of claim 11 wherein the polymer is a sulfonated poly(aryl ether sulfone).

13. The polymer of claim 8 wherein the polymer has an intrinsic viscosity greater than 0.2 dL/g.

14. The polymer of claim 1 wherein the polymer has ion exchange groups and has electron withdrawing groups attached to the ion exchange groups to enhance the acidity of the polymer binder as measured by a pKa not greater than about 2.0.

15. The polymer of claim 14 wherein the electron withdrawing group is selected from aldehyde, ketone, carboxylic acid ester, trifluoromethyl, nitrile, nitro and amino groups, and combinations thereof.

16. The polymer of claim 14 wherein the ion exchange groups are sulfonic acid groups and/or phosphonic acid groups.

17. The polymer of claim 1 wherein the second polymer segments comprise poly(aryl ether sulfones).

* * * * *